W. H. NORTHALL.
AUTOMOBILE TIRE.
APPLICATION FILED MAR. 12, 1918.
1,302,418.
Patented Apr. 29, 1919.
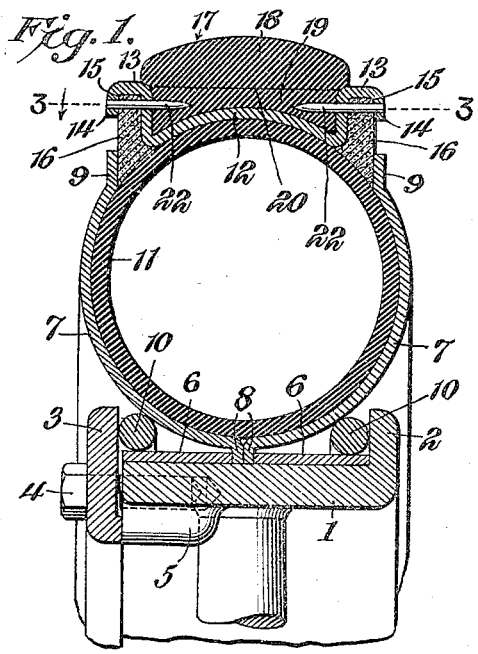
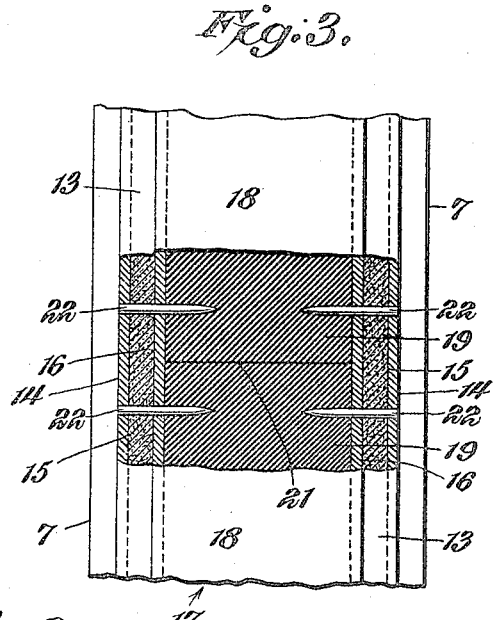
WITNESSES
Howard D. Orr.
H. T. Chapman
William H. Northall, INVENTOR,
BY E. G. Siggers
ATTORNEY

UNITED STATES PATENT OFFICE.

WILLIAM HENRY NORTHALL, OF EVANSVILLE, INDIANA, ASSIGNOR OF ONE-FOURTH TO SAMUEL C. JAMES AND ONE-FOURTH TO HERBERT MALES, BOTH OF EVANSVILLE, INDIANA.

AUTOMOBILE-TIRE.

1,302,418.

Specification of Letters Patent.   Patented Apr. 29, 1919.

Application filed March 12, 1918.   Serial No. 221,985.

*To all whom it may concern:*

Be it known that I, WILLIAM H. NORTHALL, a citizen of the United States, residing at Evansville, in the county of Vanderburg and State of Indiana, have invented a new and useful Automobile-Tire, of which the following is a specification.

This invention has reference to automobile tires and particularly tires suitable for heavy service, and the object of the invention is to provide a tire capable of service, requiring a solid tire, but which has the functions of a pneumatic tire.

In accordance with the invention there is provided an inner tube capable of being pumped up to a desired air pressure and this tube is inclosed in a metallic outer casing which may be readily assembled upon a wheel rim while the tread of the tire is formed of a solid rubber band pressing upon but separated from the pneumatic tube. Provision is made for permitting the tread to yield to forces tending to compress the inner tube and full yielding takes place without in any manner exposing the inner tube to injury or exterior contact.

The construction of the tire is such that it has long life in all parts except the tread, which latter will naturally wear out in use but may be replaced at relatively small cost, whereupon the tire is effectively a new tire.

The invention will be best understood from a construction of the following detail description taken in connection with the accompanying drawings forming part of this specification, with the understanding, however, that while the drawings show a practical form of the invention, the latter is not confined to any strict conformity with the showing of the drawings, but may be changed and modified so long as such changes and modifications mark no material departure from the salient features of the invention as set forth in the claims.

In the drawings:

Figure 1 is a radial cross section of the type of the invention mounted on a wheel rim;

Fig. 2 is a side elevation of a portion of the tire and wheel rim with some parts broken away and in section;

Fig. 3 is a section on the line 3—3 of Fig. 1.

Referring to the drawings there is shown a rim 1 which may be a flat metal rim with an integral upstanding flange 2 at one side. On the other side of the rim is a removable flange 3 held to the rim by screws 4, the rim having enlargements 5 on the inside face to strengthen it for the reception of the screws.

Adapted to what may be termed the outer face of the rim for lodgment between the flanges are cylindrical or transversely flat rings or hoops 6. Mounted on the rim is a casing made up of opposed cheek plates 7 each defining in cross section less than a semi-circle. Along the two edges of each cheek plate 7 are flanges 8 and 9 respectively, these two flanges being substantially parallel one with the other. The flanges 8 are brought into face to face contact and are there held by the hoops 6. The flanges 9 of the two plates 7 are spaced apart by a distance somewhat less than the diameter of the casing from side to side and provide a channel in which certain parts to be described may move.

The casing is further clamped to the rim by rings 10 which may be of round cross section although such particular shape is not obligatory. The rings 10 are located on respective hoops 6 and each is engaged by the flange 2 or 3 as the case may be and in turn engages a respective one of the cheek plates 7 so as to wedge thereagainst and hold the casing in true relation to the rim.

Within the casing there is located an inflatable inner tube 11 which may be of the ordinary kind.

The tube is exposed, so far as the outer casing is concerned, at the channel between the flanges 9, and applied to the tube where so exposed is a laterally curved tread ring 12 having outstanding return flanges 13 at the edges. The return part of each flange, indicated at 14, provides a channel 15 facing toward the inner tube and lodged in this channel is a ring 16 of flexible material of a comparatively stiff nature, such for instance as the material used for brake linings on automobiles. The rings 16 extend into the channel between the flanges 9 and engage the inner tube 11. These rings 16 fill the gap between the flanges 9 and 13, thus, together with the casing and the ring 12, closing all avenues of access of deleterious material to the inner tube.

The flanges 13 outstand radially from the ring 12 and provide at the tread portion of the tire a circumferential groove or channel for the reception of a tread 17, which latter, in the construction shown in the drawings, comprises two parts 18 and 19 respectively. The part 18, which is the outer part, is made of rubber or rubber composition of particularly good wear resisting qualities such as is customarily used in automobile tires for the tread thereof. The part 19 of the tread is that which is lodged in the channel between the flanges 13 and may be made of a cheaper grade of material than the part 18, thus correspondingly reducing the cost of manufacture. The two parts may be effectively integral by vulcanizing them together. The two-part construction is indicated by a line 20, in Figs. 1 and 2. The tread may be circumferentially a one-piece structure but in the drawings it is shown as made up of numerous sections, the divisions between the sections being indicated by lines 21.

In order to hold the sections together and also to connect the tread ring 12 and the filler rings 16, studs or nails 22 are driven through the flanges 13 and return parts 14, traversing the intermediate fillers 16 and extending into the tread, especially the part 19 thereof.

The parts are readily assembled by applying the tread to the tread ring 12 and at the same time securing the filler rings 16 thereto. Since the casing is a two part casing divided circumferentially it is an easy matter to assemble the tire by first placing a hoop 6 on the rim, then a ring 10, then one of the cheek plates 7, then applying the inner tube 11 and lodging the assembled tread and tread ring thereof with the filler rings fast thereto, then applying the other cheek plate 7 of the casing, the corresponding hoop 6 and lock ring 10, and finally applying the removable flange 3 and securing it in place by the screws 4. Now the inner tube may be pumped up in the usual manner to the desired internal pressure so that the tread ring and tread are elastically carried and will support the wheel through the confined air under pressure but with the tread free to respond to shocks and jars to which it may be subjected.

Creeping of the casing is prevented by the tight clamping of the rings 10 thereagainst and side movements of the casing are similarly avoided. The tread ring is engaged by the inner tube over a very extended surface and the pressure of the inner tube also forces the rings 16 tightly against the flanges 9 so that there is practically no liability of creeping of the tread upon the inner tube or injury to the latter. The longitudinally divided outer casing may be made of sheet steel and the same material may be used for the hoops 6 and the tread ring 12. Such material is inherently strong and may be made of relatively light gage. Such sheet material is readily rolled or pressed into shape and is strongly resistant to breakage.

In the normal condition of the wheel there is a suitable space between the return portion 14 of each flange 13 and the neighboring edge of corresponding flange 9 so that the tread may yield to a considerable extent before the flanges 9 and 14 contact. At all times the rings 16 and flanges 9 engage face to face even under the most violent conditions of use, and there is, therefore, no danger of dirt or other material reaching the inner tube to harm it.

What is claimed is:

1. A pneumatic tire comprising an outer casing with rigid curved sides and having a peripheral opening at the tread portion, a pneumatic tube lodged in the casing, and a separate tread member entering the casing through the tread portion and engaging the pneumatic tube, said tread member comprising a rigid ring bearing against the tube, filler rings attached to said rigid ring at each side and bearing against the tube between the sides of the rigid ring and the sides of the casing, and wear material carried by the tread ring.

2. A pneumatic tire comprising a tubular casing with the tread portion open, a pneumatic tube lodged in the casing, and a separate tread member entering the casing through the tread portion and engaging the pneumatic tube, said tread member comprising a rigid ring conforming to and bearing against the tube, non-metallic filler rings filling the space at the open tread portion between the sides of the casing and the sides of the ring and secured to one of said parts and bearing directly against the tube, and wear material carried by the outer face of the tread ring.

3. A pneumatic tire comprising a rigid casing of substantially tubular form with the sides spaced apart at the tread portion and there provided with outstanding parallel flanges, an inner tube lodged in the casing and extending outwardly through the opening at the peripheral portion of the casing, and a tread member movable between the flanges into and out of the casing and separate from both the casing and inner tube and supported by the latter, said tread member comprising a rigid ring curved laterally in conformity with the inner tube, and of a width less than the portion of the tube exposed at said opening, and filler rings on opposite sides of and carried by the rigid ring and engaging the inner faces of the flanges of the casing and also covering all that portion of the tube between the sides of the casing and the sides of the rigid ring.

4. A pneumatic tire comprising a rigid casing of substantially tubular form with the sides spaced apart at the tread portion and there provided with outstanding parallel flanges, an inner tube lodged in the casing and extending outwardly through the opening at the peripheral portion of the casing, and a tread member movable between the flanges into and out of the casing and separate from both the casing and inner tube and supported by the latter, said tread member comprising a rigid ring curved laterally in conformity with the inner tube, and having edge return flanges matching the outer flanges of the casing, and non-metallic rings on opposite sides of and carried by the return flanges of the curved ring and engaging the inner faces of the flanges of the casing and closing the space between the outer edges of the casing and the outer edges of the tread member, and means for securing the non-metallic rings to said return flanges.

5. In combination with a wheel rim flanged at both sides, one of said flanges being removable, a two-part outer casing having parallel flanges at the opposed inner edges of the casing, flat hoops mounted on the outer face of the rim between the flanges thereof and the flanges of the casing to hold the parts of the casing in place, and also hold the casing to the rim, and means for holding the hoops in position on the rim.

6. In combination with a wheel rim flanged at both sides, one of said flanges being removable, a two-part outer casing having parallel flanges at the opposed inner edges of the casing, flat hoops mounted on the outer face of the rim between the flanges thereof and the flanges of the casing, to hold the parts of the casing in place and also hold the casing to the rim, and locking rings for holding the flat hoops in place, said rings being round in cross section and adapted to be wedged between the flanges of the rim and the outer casing beyond the line of division and bearing upon the flat hoops.

In testimony that I claim the foregoing as my own, I have hereto affixed my signature in the presence of witnesses.

WILLIAM HENRY NORTHALL.

Witnesses:
    SAMUEL CYRUS JAMES,
    GERTRUDE NORTHALL,
    HERBERT MALES,
    GLADYS NORTHALL.

Copies of this patent may be obtained for five cents each, by addressing the "Commissioner of Patents Washington, D. C."